(12) United States Patent
Wu et al.

(10) Patent No.: US 12,324,718 B2
(45) Date of Patent: Jun. 10, 2025

(54) ROOT CANAL TREATMENT DEVICE

(71) Applicant: GUILIN WOODPECKER MEDICAL INSTRUMENT CO., LTD., Guangxi (CN)

(72) Inventors: Xunxian Wu, Guangxi (CN); Yoshitsugu Terauchi, Guangxi (CN); Fengwen Wei, Guangxi (CN); Kunyou Wu, Guangxi (CN); Jianfeng Zhan, Guangxi (CN); Xingzhi Xian, Guangxi (CN); Zerong Chen, Guangxi (CN)

(73) Assignee: GUILIN WOODPECKER MEDICAL INSTRUMENT CO., LTD., Guangxi (CN)

( * ) Notice: Subject to any disclaimer, the term of this patent is extended or adjusted under 35 U.S.C. 154(b) by 309 days.

(21) Appl. No.: 17/792,666

(22) PCT Filed: Dec. 30, 2020

(86) PCT No.: PCT/CN2020/141639
§ 371 (c)(1),
(2) Date: Jul. 13, 2022

(87) PCT Pub. No.: WO2022/110495
PCT Pub. Date: Jun. 2, 2022

(65) Prior Publication Data
US 2023/0053221 A1 Feb. 16, 2023

(30) Foreign Application Priority Data
Nov. 27, 2020 (CN) .......................... 202011358766.9
Nov. 27, 2020 (CN) .......................... 202022805145.2

(51) Int. Cl.
A61C 5/42 (2017.01)
A61C 1/06 (2006.01)
(Continued)

(52) U.S. Cl.
CPC ................. A61C 5/42 (2017.02); A61C 1/06 (2013.01); A61C 1/07 (2013.01); A61C 1/12 (2013.01)

(58) Field of Classification Search
CPC .... A61C 5/42; A61C 5/40; A61C 1/06; A61C 1/07; A61C 1/12; A61C 1/02; A61C 1/08
(Continued)

(56) References Cited

FOREIGN PATENT DOCUMENTS

CN 101355915 A 1/2009
CN 103249371 A 8/2013
(Continued)

OTHER PUBLICATIONS

Abe, E., JP 10165416 A, Med. Treatment Apparatus E.g For Enlarging Root Canal Of Teeth Has Pair Of Lead Wires Whose One End Extends To Form Measurement And Counter Electrode Terminal, Which Are Held To Patient's Lips While Other End Is Connected Apical Foreamen Position Detector, Machine translation (Year: 1998).*
(Continued)

Primary Examiner — Cris L. Rodriguez
Assistant Examiner — Mirayda A Aponte
(74) Attorney, Agent, or Firm — BCF LLP

(57) ABSTRACT

A root canal treatment device relates to the technical field of dental treatment instruments. The root canal treatment device includes a contra-angle hand-piece and a root canal file detachably connected to the contra-angle hand-piece, and further includes a drive module in transmission connection with the root canal file, the drive module includes a rotation driver and a vibration generator, wherein the rotation driver is configured to drive the root canal file to rotate axially, so as to mechanically cut and ream the root canal, thus shaping the root canal, and the vibration generator is configured to drive the root canal file to vibrate radially.

15 Claims, 11 Drawing Sheets

(51) Int. Cl.
*A61C 1/07* (2006.01)
*A61C 1/12* (2006.01)

(58) Field of Classification Search
USPC .................................................. 433/102
See application file for complete search history.

(56) References Cited

FOREIGN PATENT DOCUMENTS

| CN | 111166506 A | | 5/2020 |
|---|---|---|---|
| CN | 112168384 A | | 1/2021 |
| EP | 3064165 A1 | | 9/2016 |
| EP | 3238653 A1 | | 11/2017 |
| JP | S6131414 U | | 2/1986 |
| JP | 10165416 A | * | 6/1998 |
| JP | H10165415 A | | 6/1998 |
| JP | H10165416 A | | 6/1998 |
| JP | 2006216439 A | | 8/2006 |
| JP | 2011110246 A | | 6/2011 |
| JP | 2020065914 A | | 4/2020 |

OTHER PUBLICATIONS

Liu, Xin-hua, A Measuring Device For Ultrasonic Root Canal Treatment, machine translation (Year: 2019).*
International Search Report and Written Opinion (and English Translation of ISR) with regard to PCT/CN2020/141639 mailed Jul. 29, 2021.
English Abstract for CN112168384 retrieved on Espacenet on Jun. 20, 2022.
English Abstract for CN111166506 retrieved on Espacenet on Jun. 20, 2022.
English Abstract for CN103249371 retrieved on Espacenet on Jun. 20, 2022.
English Abstract for CN101355915 retrieved on Espacenet on Jun. 20, 2022.
English Abstract for JPH10165416 retrieved on Espacenet on Jun. 20, 2022.
Decision to Grant with regard to te counterpart Japanese Patent Application No. 2022-535937 issued Dec. 7, 2023.
Office Action and Search Report with regard to the counterpart EP Patent Application No. 20963383.3 completed Jun. 6, 2023.
Office Action with regard to te counterpart Japanese Patent Application No. 2022-535937 issued Jun. 27, 2023.

* cited by examiner

ROOT CANAL TREATMENT DEVICE

CROSS-REFERENCE TO RELATED APPLICATION

The present disclosure claims the priority to the Chinese patent application with the filing No. 202011358766.9, filed on Nov. 27, 2020 with the Chinese Patent Office, entitled "Root Canal Treatment Device", the contents of which are incorporated herein by reference in entirety.

The present disclosure claims the priority to the Chinese patent application with the filing No. 202022805145.2, filed on Nov. 27, 2020 with the Chinese Patent Office, entitled "Root Canal Treatment Device", the contents of which are incorporated herein by reference in entirety.

TECHNICAL FIELD

The present disclosure relates to the technical field of dental treatment instruments, and particularly to a root canal treatment device.

BACKGROUND ART

People's tooth includes a dental pulp cavity, and also includes 1-4 root canals, through which dental nerve and blood vessels for nutrient of nerve are led out. Infection in the dental pulp due to various conditions will cause functional damage to the tooth, and will cause pains and diseases such as jaw infection. Root canal treatment, also called as dental pulp treatment, is a treatment method for protecting affected teeth developed in recent years, and has good treatment and protection effects on dental problems such as chronic pulpitis, chronic periapical periodontitis, combined periodontal dental pulp lesion, and trauma tooth.

The root canal treatment includes several main treatment stages such as root canal preparation, disinfection, and root canal filling. The root canal preparation and disinfection are to mechanically cut and ream the root canal so as to obtain a required shape, and create a better spatial condition for subsequent root canal filling. After organic substances in the root canal and infected tissues (bacteria) of the root canal are removed by rinsing, and root canal debridement is completed, a drug material is filled in the root canal, so that the filled drug material is attached to a root canal wall.

In the prior art, positive pressure rinsing of the root canal can hardly ensure sufficient cleaning of a lower end of the root canal, thus a part of organic substances and infected tissues at the lower end of the root canal can hardly be removed sufficiently, and the root canal cleaning time is too long, and the patient opens his/her mouth for a long time, then the suffering of the patient is prolonged, moreover, as the drug material filled into the root canal after the root canal cleaning is usually a pasty material formed by blending powder and water, the drug material will be inevitably mixed with air bubbles in the blending process. The method of vibration washing with an ultrasonic vibration washer has unfavorable effect of removing the air bubbles in the drug material, and the air bubbles mixed in the drug material will affect the attachment tightness of the drug material to the root canal wall.

SUMMARY

An objective of embodiments of the present disclosure is to provide a root canal treatment device, which can effectively reduce the time consumption of a washing process of root canal treatment, and improve the efficiency and effect of cleaning infected tissues and a drug liquid in the root canal.

An embodiment of the present disclosure provides a root canal treatment device, including a contra-angle hand-piece and a root canal file detachably connected to the contra-angle hand-piece, and further including a drive module in transmission connection with the root canal file, wherein the drive module includes a rotation driver and a vibration generator, the rotation driver is configured to drive the root canal file to rotate axially, and the vibration generator is configured to drive the root canal file to vibrate radially.

In an implementable mode of the embodiments of the present disclosure, the root canal treatment device further includes a handle connected to the contra-angle hand-piece, the rotation driver is provided in the handle and the rotation driver drives the root canal file to rotate through the contra-angle hand-piece, the vibration generator is provided on the handle, and a vibration end of the vibration generator acts on the root canal file.

In an implementable mode of the embodiments of the present disclosure, the vibration generator is an ultrasonic transducer.

In an implementable mode of the embodiments of the present disclosure, the ultrasonic transducer includes a shell and a transducer body provided inside the shell, and the shell is integrally molded with the handle, alternatively, the shell and the handle are detachably connected through a threaded fastener or a clamping member.

In an implementable mode of the embodiments of the present disclosure, a vibration connector is further provided between the ultrasonic transducer and the root canal file, and the ultrasonic transducer is connected to the root canal file through the vibration connector.

In an implementable mode of the embodiments of the present disclosure, a vibration head is provided at one end of the vibration connector connected to the root canal file, and the vibration head is configured to have an end surface connected to the root canal file to be a concave arc surface.

In an implementable mode of the embodiments of the present disclosure, a diameter of the arc surface of the vibration head is greater than or equal to a diameter of the root canal file.

In an implementable mode of the embodiments of the present disclosure, the vibration connector includes a first connecting rod and a second connecting rod whose end portions are sleeved with each other, and a fastener sleeved on a sleeve end of the first connecting rod, and the fastener is configured to fix the sleeve end of the first connecting rod and the second connecting rod.

In an implementable mode of the embodiments of the present disclosure, the first connecting rod is configured to be detachably connected to a connecting seat at the other end connected to the root canal file, and a fixing member is arranged to penetrate the connecting seat and the first connecting rod.

In an implementable mode of the embodiments of the present disclosure, a nickel-titanium connecting rod is further provided between the ultrasonic transducer and the root canal file, and the ultrasonic transducer is connected to the root canal file through the nickel-titanium connecting rod.

In an implementable mode of the embodiments of the present disclosure, the vibration generator is a vibrator, the vibrator includes a plastic housing and a vibration motor provided in the plastic housing, and the vibrator is fixed on the contra-angle hand-piece through the plastic housing; and a vibration output end of the vibration motor is connected to a jacking block through an elastic member, and the jacking block is extended out of the plastic housing through an opening provided on the plastic housing, and abuts against the root canal file at a side wall of the root canal file.

In an implementable mode of the embodiments of the present disclosure, a hook portion is formed on the jacking block, and the hook portion is configured to be snapped with an inner wall of the opening of the plastic housing, so as to limit the length of the jacking block extended out of the opening.

In an implementable mode of the embodiments of the present disclosure, the vibrator further includes a power supply provided in the handle, and the power supply is electrically connected to the vibration motor through a wire, and is configured to supply power to the vibration motor.

In an implementable mode of the embodiments of the present disclosure, a vibration-absorbing rubber pad is provided on the plastic housing, and the plastic housing and the contra-angle hand-piece are fixedly snapped to each other through the vibration-absorbing rubber pad.

In an implementable mode of the embodiments of the present disclosure, the root canal treatment device further includes a controller, and the controller is electrically connected to the rotation driver and the vibration generator, respectively, and is configured to control the operation of the rotation driver and the vibration generator, respectively.

The root canal treatment device provided in the embodiments of the present disclosure includes the contra-angle hand-piece and the root canal file detachably connected to the contra-angle hand-piece, and further includes a drive module in transmission connection with the root canal file, the drive module includes the rotation driver and the vibration generator, the rotation driver is configured to drive the root canal file to rotate axially, so as to mechanically cut and ream the root canal, thus shaping the root canal, and the vibration generator is configured to drive the root canal file to vibrate radially. Vibration of the root canal file at a specific frequency can sufficiently activate the activity of the drug material filled in the root canal, especially in the process of filling the drug material into the root canal, the vibration provided by the vibration generator and the rotation of the root canal file that are carried out simultaneously can efficiently discharge the air bubbles in the drug material filled in the root canal, so that the drug material can be tightly filled into the root canal, thereby providing a better environment for subsequent root canal treatment, improving the effect of root canal treatment, and relieving the patients' pain.

BRIEF DESCRIPTION OF DRAWINGS

In order to more clearly illustrate technical solutions of embodiments of the present disclosure, drawings required for use in the embodiments of the present disclosure will be described briefly below. It should be understood that the drawings below are merely show some embodiments of the present disclosure, and therefore should not be considered as limitation to the scope. Those of ordinary skill in the art could also obtain other relevant drawings according to these drawings without any creative effort.

Figure 1:
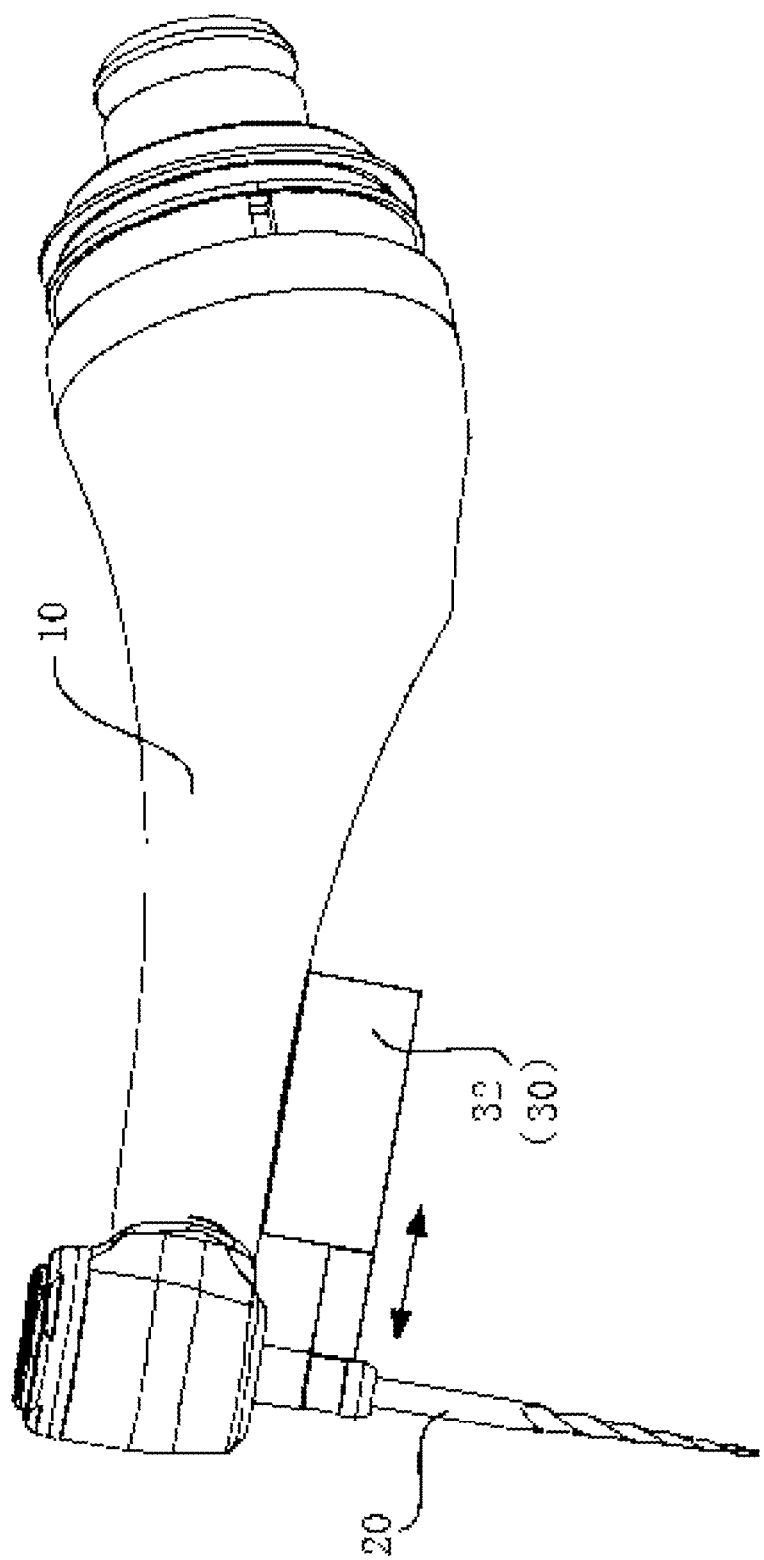
FIG. 1 is a first structural schematic view of a root canal treatment device provided in some embodiments of the present disclosure.

Reference signs: 10—contra-angle hand-piece; 20—root canal file; 30—drive module; 31—rotation driver; 32—vibration generator; 321—shell; 322—transducer body; 323—plastic housing; 324—vibration motor; 325—elastic member; 326—jacking block; 3261—hook portion; 327—vibration-absorbing rubber pad; 40—handle; 50—vibration connector; 501—vibration head; 51—first connecting rod; 52—second connecting rod; 53—fastener; 54—connecting seat; 55—fixing member; 60—controller.

DETAILED DESCRIPTION OF EMBODIMENTS

Below, the technical solutions in the embodiments of the present disclosure will be described clearly and completely with reference to the drawings in the embodiments of the present disclosure.

In the description of the present disclosure, it should be noted that orientation or positional relationships indicated by terms such as "inner" and "outer" are based on orientation or positional relationships as shown in the drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure. Besides, terms such as "first" and "second" are merely used for distinctive description, but should not be construed as indicating or implying importance in the relativity.

It also needs to be indicated that unless otherwise specified and defined explicitly, terms "provide" and "connect" should be construed in a broad sense. For example, it may be a fixed connection, and also may be a detachable connection, or an integrated connection; it may be a direct connection, an indirect connection through an intermediate medium, or inner communication between two elements. For a person ordinarily skilled in the art, specific meanings of the above-mentioned terms in the present disclosure could be understood according to specific circumstances.

In the process of performing the tooth root canal treatment surgery, the root canal first needs to be subjected to preliminary shaping and vibration-washing cleaning. The preliminary shaping aims at providing an accurate shaping effect, and ensuring an operation space for subsequent processing. The preliminary shaping of the root canal is achieved mainly by grinding an inner wall of the root canal by rotating a root canal file in the root canal at high speed. The vibration-washing cleaning aims at cleaning original pathological tissues, bacteria and other substances in the root canal. Generally, the root canal is continuously rinsed by means of pressurization, but it is difficult to effectively clean a lower section of the root canal, moreover, the existing file needle of the root canal vibration-washing device is generally a stainless steel or titanium alloy file needle, and the file needle of these materials has a relatively hard texture, and usually can only effectively clean and wash a straight root canal or middle and lower parts of a curved root canal, but have unfavorable cleaning effect on a root tip part of complex curved root canals. If a positive pressure and a negative pressure are used in conjunction for rinsing, structural complexity and device costs will be increased. It is also possible to effectively remove air bubbles in the filled drug material through the acoustic streaming effect and the cavitation effect in a manner of replacing an operation device and making the file needle in the device vibrate in the root canal at ultrasonic frequency. However, in this manner, the operation device needs to be replaced multiple times, the above processes in the root canal treatment usually need to be alternately carried out according to needs of state of illness, then frequent replacement of the treatment operation devices makes the operation inconvenient, and the surgery efficiency is low.

On this basis, an embodiment of the present disclosure provides a root canal treatment device. FIG. 1 is a first structural schematic view of a root canal treatment device provided in some embodiments of the present disclosure. As shown in FIG. 1, the root canal treatment device provided in an embodiment of the present disclosure includes a contra-angle hand-piece 10 and a root canal file 20 detachably connected to the contra-angle hand-piece 10, and further includes a drive module 30 in transmission connection with the root canal file 20, the drive module 30 includes a rotation driver 31 (not shown in FIG. 1) and a vibration generator 32, the rotation driver 31 is configured to drive the root canal file 20 to rotate axially, and the vibration generator 32 is configured to drive the root canal file 20 to vibrate radially.

As shown in FIG. 1, in the root canal treatment device provided in an embodiment of the present disclosure, the contra-angle hand-piece 10 is configured to be provided on a handle member, and necessary circuit connection is carried out. By operating and controlling the operation of the rotation driver 31 and the vibration generator 32 in the drive module 30, the root canal file 20 is allowed to form a corresponding operation mode, so as to perform corresponding operations on the root canal, respectively. In the above, the rotation driver 31 is configured to drive the root canal file 20 to rotate, a head portion of the root canal file 20 is a pointed end, and is configured to extend into the interior of the root canal, and when the root canal file 20 rotates in a self-rotating manner at a certain speed, an inner wall of the root canal where a side wall of the root canal file 20 touches can form a desired shape through the grinding of the root canal file 20. Moreover, in the process of injecting a solution such as sodium hypochlorite into the root canal to wash the root canal, and in the process of filling the root canal with a pasty filling material after the washing, the rotary action of the rotation driver 31 is required to drive the root canal file 20 to rotate, to realize sufficient vibration washing and filling. Generally, the pasty filling material is prepared by mixing pharmaceutical powder, for example, bioceramic or mineral trioxide aggregate with water, and in the preparation process of the pasty filling material, it is inevitable that air will be mixed in to form air bubbles, and when the pasty filling material is filled into the root canal, it is also desirable to remove these air bubbles as much as possible, so that the drug material can be filled as tightly in the root canal as possible. In this condition, when the root canal file 20 is rotating, the vibration generator 32 is controlled to drive the root canal file 20 to vibrate at a pre-set frequency along a radial direction of the root canal file 20. The rotation of the root canal file 20 in combination with the vibration can help stimulate the activity of the filled drug, and quickly and efficiently discharge the air bubbles. Alternatively, the vibration generator 32 can be separately controlled to drive the root canal file 20 to vibrate in the process of root canal washing or root canal filling, so that the operation modes of the root canal file 20 are diversified, the operation inconvenience caused by replacement of operation devices during root canal treatment surgery is reduced, the requirements of various steps of root canal treatment can be met, and the root canal treatment efficiency and effect can be effectively improved.

It should be noted that, firstly, as the rotation driver 31 is usually provided in the contra-angle hand-piece 10, the position and structure of the rotation driver 31 are not shown in FIG. 1, for example, the rotation driver 31 may be a rotary motor, and an output end of the rotary motor acts on a rotating shaft of the head portion of the contra-angle hand-piece 10, the root canal file 20 is driven to rotate by the rotating shaft, wherein the rotation may be one-way rotation or reciprocating rotation, and the rotation speed may be set as 50-3000 rpm according to needs. No specific limitation is provided in the present embodiment, and a person skilled in the art could perform corresponding configuration and operations as required.

Secondly, a specific implementation structure form of the vibration generator 32 is not specifically limited in the embodiments of the present disclosure, and the vibration generator 32, as a part of the drive module 30, is configured to act on the root canal file 20, so that the root canal file 20 is driven to vibrate radially. Moreover, as it is a surgical operation applied to the root canal in the human oral cavity, the vibration output by the vibration generator 32 generally has a large frequency, and small amplitude, mainly for the purpose of helping cleaning in the root canal and activation of the drug liquid in the process of root canal treatment. The ranges of amplitude and frequency of the vibration are not specifically limited in the embodiments of the present disclosure, a person skilled in the art could perform corresponding configuration and operations according to actual operation requirements on the basis that the above purpose can be satisfied.

The root canal file 20 is configured to extend into the dental root canal to rotate or further perform vibration grinding, for example, the root canal file 20 is made of a nickel-titanium alloy material. The nickel-titanium alloy has relatively soft texture and good flexibility, when the nickel-titanium alloy material is processed into the root canal file 20, the root canal file 20 extends into a root canal that may be in an irregular shape, and the root canal file 20 made of nickel-titanium alloy can be deformed to a certain extent so as to be adapted to an actual shape of the root canal, thus, the root canal file 20 can be extended into a deep part of the root canal, realizing a better shaping and cleaning effect of the root canal.

Moreover, in FIG. 1, providing the vibration generator 32 on an outer wall of the contra-angle hand-piece 10 is merely an exemplary structural representation, and this is not specifically limited in the embodiments of the present disclosure, for example, the vibration generator may also be provided in the contra-angle hand-piece 10 or on a structure such as the handle member.

The root canal file 20 is detachably connected to the contra-angle hand-piece 10, wherein the detachable connection manner between the root canal file 20 and the contra-angle hand-piece 10 may include magnetic attraction, snap-fit arrangement and/or threaded fastener connection, etc. As mounting different operation heads at an end portion of the contra-angle hand-piece 10 can correspondingly allow various related operations of dental surgery, the detachable connection manner facilitates replacement and use of the operation heads of the root canal treatment device in the embodiments of the present disclosure in use.

An root canal treatment device provided in an embodiment of the present disclosure includes the contra-angle hand-piece 10 and the root canal file 20 detachably connected to the contra-angle hand-piece 10, and further includes the drive module 30 in transmission connection with the root canal file 20, the drive module 30 includes a rotation driver 31 and the vibration generator 32, the rotation driver 31 is configured to drive the root canal file 20 to rotate axially to mechanically cut and ream the root canal, so as to shape the root canal, and the vibration generator 32 is configured to drive the root canal file 20 to vibrate radially. Vibration of the root canal file 20 at a specific frequency can make the drug liquid filled in the root canal more tightly, especially in the process of washing the root canal to discharge the drug liquid, the rotation and the vibration of the root canal file 20 carried out simultaneously can efficiently discharge the air bubbles in the drug filled in the root canal, so that the drug liquid is tightly filled into the root canal, thereby providing a better environment for subsequent root canal treatment, improving the effect of root canal treatment, and relieving the patients' pain.

Figure 2:
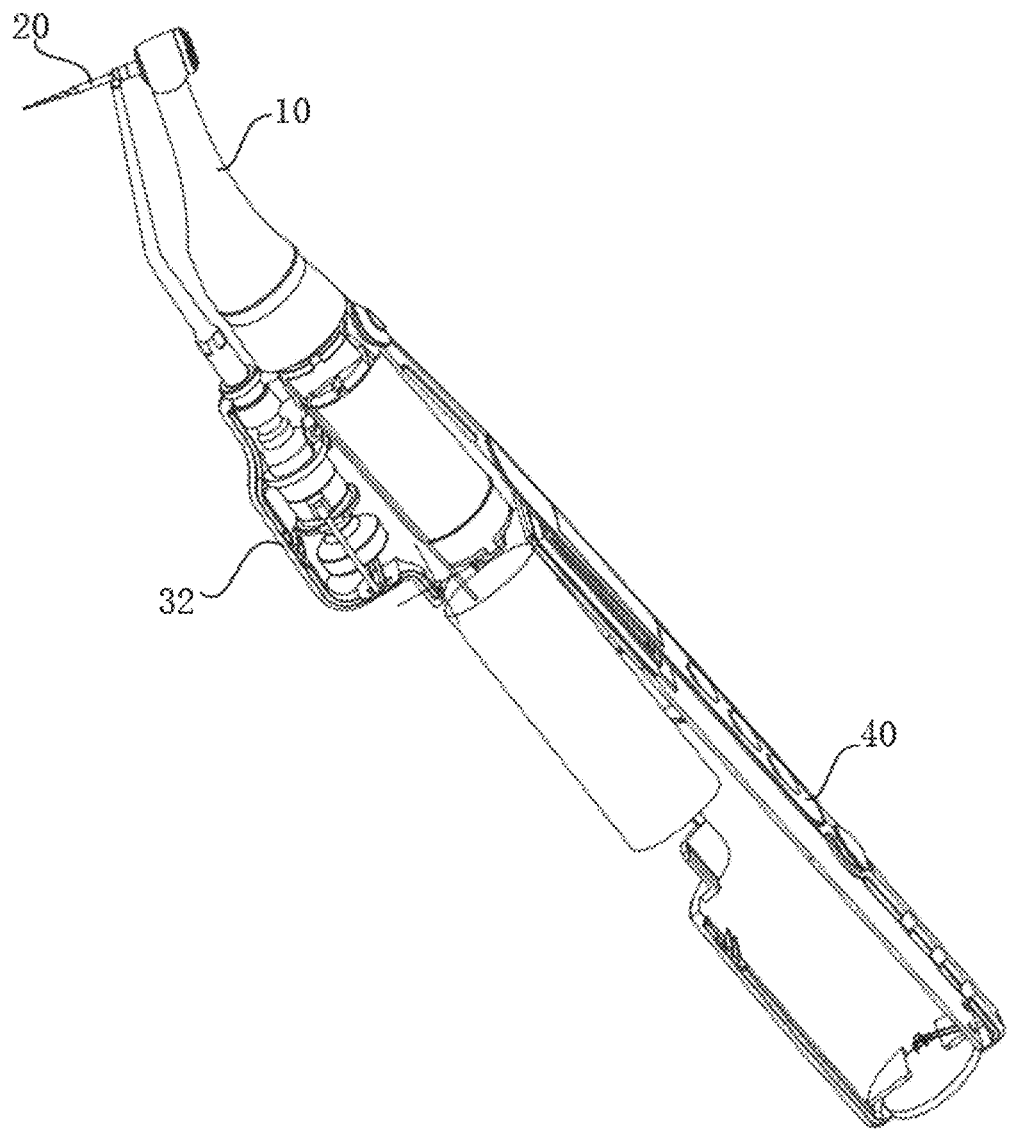
FIG. 2 is a second structural schematic view of the root canal treatment device provided in some embodiments of the present disclosure.

FIG. 2 is a second structural schematic view of a root canal treatment device provided in some embodiments of the present disclosure. As shown in FIG. 2, optionally, the root canal treatment device further includes a handle 40 connected to the contra-angle hand-piece 10, the rotation driver 31 is provided in the handle 40 and the rotation driver 31 drives the root canal file 20 to rotate through the contra-angle hand-piece 10. The vibration generator 32 is provided on the handle 40, and a vibration end of the vibration generator 32 acts on the root canal file 20.

The root canal treatment device generally includes the handle 40 connected to the contra-angle hand-piece 10, the handle 40 usually adopts a profile structure facilitating hand-held operation, all the wiring and functional devices required in the root canal treatment device are provided in the handle 40, and corresponding control keys are provided on the handle 40, then during surgery, the root canal treatment device can be made to perform corresponding operations by manipulating corresponding control keys on the handle 40, thus, the operation of the root canal treatment device of the embodiments of the present disclosure is simplified as much as possible, and the operation is made more convenient.

In the root canal treatment device provided with the handle 40, both the rotation driver 31 and the vibration generator 32 in the drive module 30 are provided at the handle 40, wherein the rotation driver 31 is provided inside a hollow structure of the handle 40, and an output end of the rotation driver 31 is transmitted to the rotating shaft in the contra-angle hand-piece 10, so as to drive the root canal file 20 to rotate, the vibration generator 32 is provided on the handle 40, and a vibration end of the vibration generator 32 directly acts on the root canal file 20, so as to precisely realize the drive of vibration.

Exemplarily, as shown in FIG. 2, in an implementable mode of the embodiments of the present disclosure, the vibration generator 32 is an ultrasonic transducer.

The ultrasonic transducer is a device converting electromagnetic energy into mechanical energy (acoustic energy), and is generally made of a piezoelectric ceramic or other magnetostrictive materials, and the ultrasonic vibration output by the ultrasonic transducer can continuously output vibration with an amplitude of 15-120 microns at a frequency of 20-60 KHz. In the present embodiment, the vibration generator 32 is an ultrasonic transducer, by which mechanical energy for vibration of the root canal file 20 is provided. The ultrasonic transducer is stable in operation, has a dimension that can be matched with the root canal treatment device of the embodiments of the present disclosure, and is a preferred implementation form of the vibration generator 32.

Figure 3:
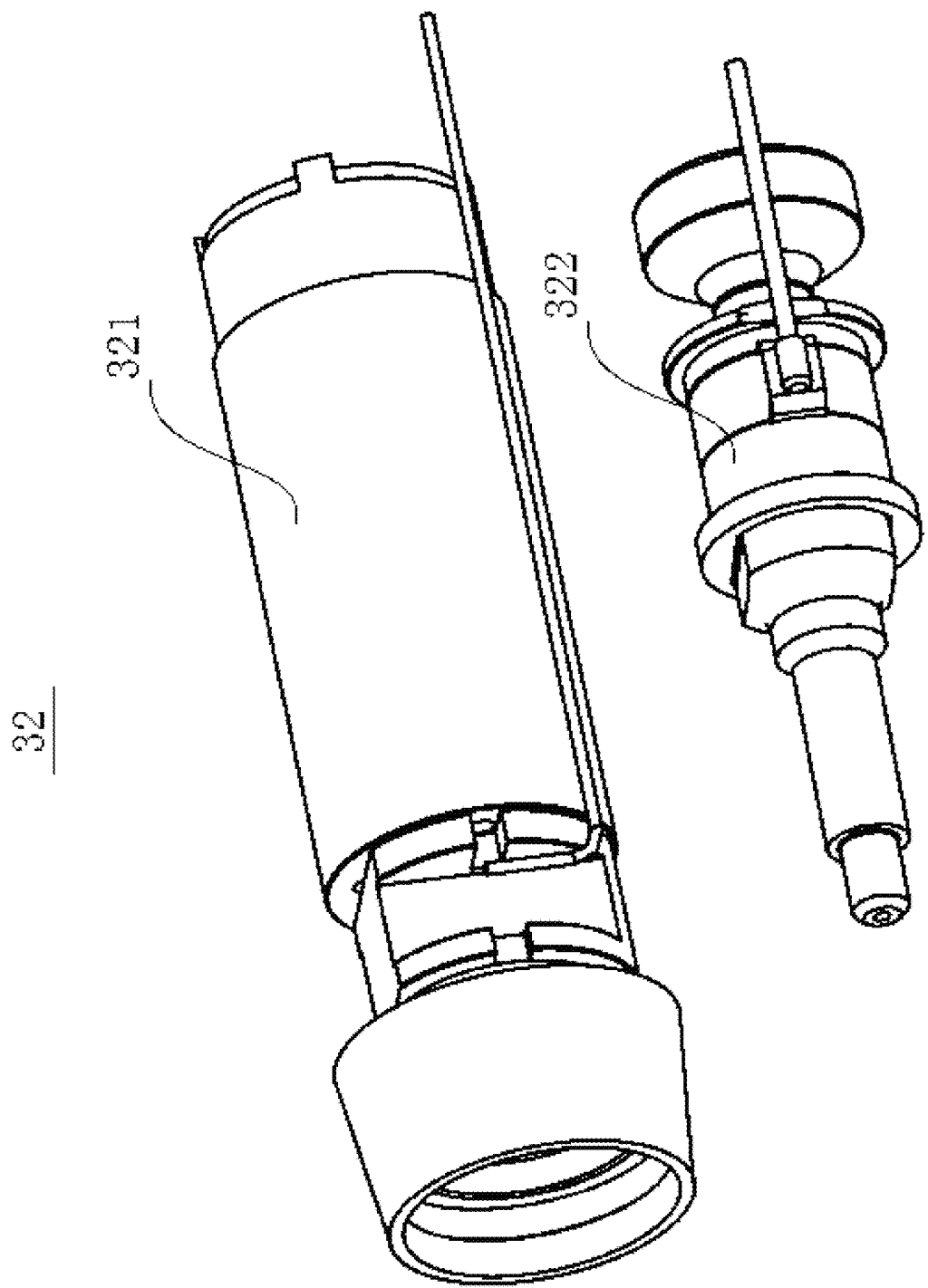
FIG. 3 is a structural schematic view of a vibration generator, being an ultrasonic transducer, in the root canal treatment device provided in some embodiments of the present disclosure.

Specifically, FIG. 3 is a structural schematic view of the vibration generator, being an ultrasonic transducer, in the root canal treatment device in an embodiment of the present disclosure. In an implementable mode of an embodiment of the present disclosure, as shown in FIG. 3, the ultrasonic transducer includes a shell 321 and a transducer body 322 provided inside the shell 321, and the shell 321 is integrally molded with the handle 40.

The shell 321 of the ultrasonic transducer and the handle 40 are integrally molded, for example, the shell 321 and the handle 40 are both made of a plastic material, and are molded into one piece by injection molding, or if the shell 321 and the handle 40 are made of a metal material, the two are connected into one piece by means of welding, etc. The connection mode of integral molding makes the handle 40 and the shell 321 of the ultrasonic transducer have better structural stability therebetween. When the ultrasonic transducer is started and generates vibration, the integrally molded structure is unlikely to have the problem of cracking or breaking, and the transmission loss of vibration is also small.

For another example, the shell 321 and the handle 40 further may be detachably connected through a threaded fastener or a clamping member. That is, the shell 321 and the handle 40 are in separate housing structures, and the two are detachably connected, wherein for the detachable connection method, a threaded fastener may be selected for threaded connection according to needs, and fixing by means of threaded connection is relatively stable. Alternatively, an interference fit manner is selected for snapping, a snap-fit connection manner is selected for snapping, etc. The snapping mode makes the replacement more convenient and quick. Alternatively, other detachable connection manners may also be used. In summary, the detachable connection manner between the shell 321 and the handle 40 facilitates the disassembly and adjustment of the vibration generator 32, resulting in convenient use.

Figure 4:
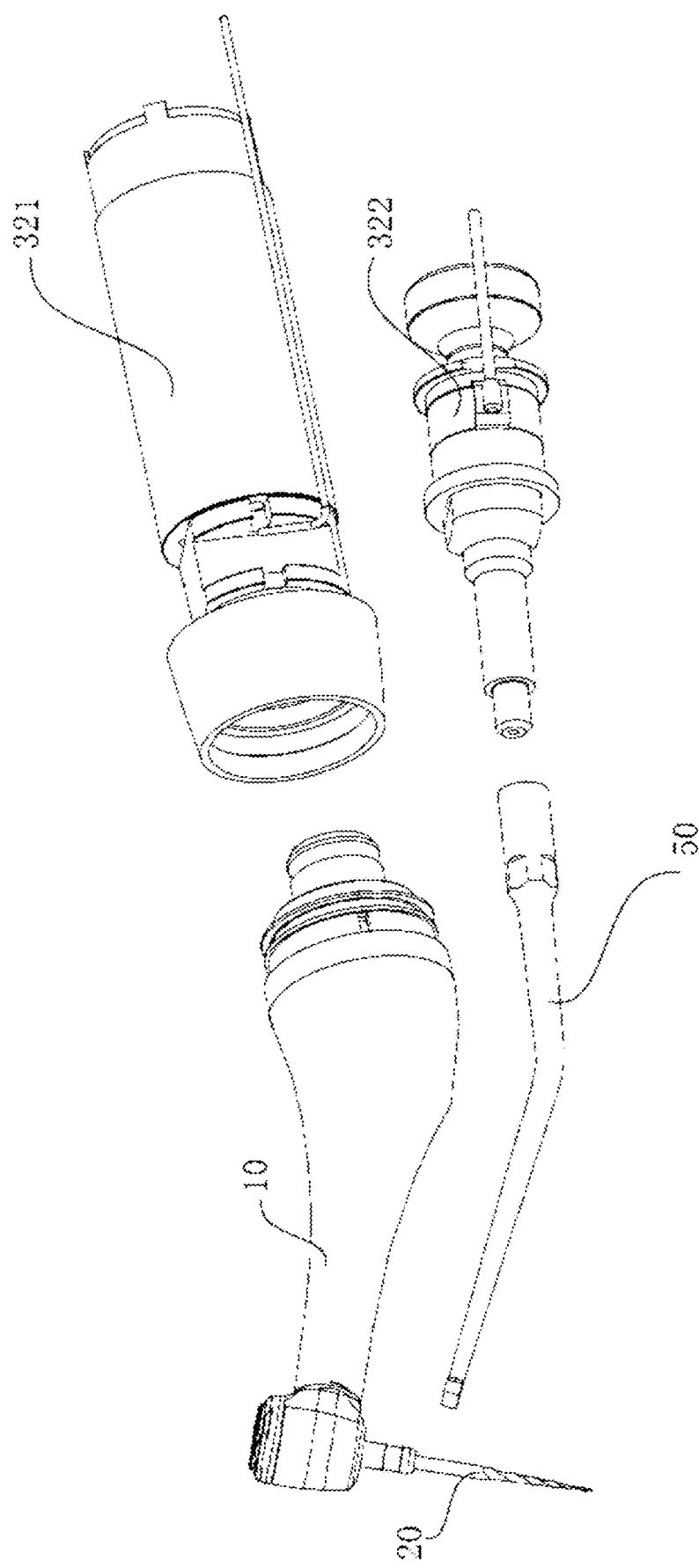
FIG. 4 is a structural schematic view of connecting the ultrasonic transducer and a root canal file through a vibration connector in the root canal treatment device provided in some embodiments of the present disclosure.

FIG. 4 is a structural schematic view of connecting the ultrasonic transducer and the root canal file through a vibration connector in the root canal treatment device provided in some embodiments of the present disclosure. As shown in FIG. 4, in an implementable mode of the embodiments of the present disclosure, a vibration connector 50 is further provided between the ultrasonic transducer and the root canal file 20, and the ultrasonic transducer is connected to the root canal file 20 through the vibration connector 50.

As the ultrasonic transducer is provided on the handle 40, and has a certain distance from the root canal file 20, in order to improve the transmission efficiency of the vibration of the ultrasonic transducer, and ensure a parameter requirement of the vibration in the transmission process of vibration, the vibration connector 50 is provided between the ultrasonic transducer and the root canal file 20, and the vibration connector 50 is configured to transmit the vibration output from the ultrasonic transducer to the root canal file 20 and act directly on the root canal file 20. Generally, in order to effectively transmit the vibration of the ultrasonic transducer to the root canal file 20, the vibration connector 50 is made of a hard material. However, considering that the vibration directly acts on the root canal file 20, in order to avoid damage to the root canal file 20 by the vibration acting on the root canal file 20 as far as possible, a corresponding protection structure can be provided at one end of the vibration connector 50 acting on the root canal file 20. The protection structure used in the embodiments of the present disclosure is not specifically limited, for example, in terms of structure, an action surface as large as possible with the root canal file 20 may be provided, and an action surface fitted with the structure of the root canal file 20 may be provided, and in terms of material, the action surface also can be made of a material with a certain buffer capacity. Moreover, as the contra-angle hand-piece 10 usually has a certain bending angle, the vibration of the ultrasonic transducer provided on the handle 40 is transmitted to the root canal file 20 through the vibration connector 50 to make the root canal file 20 vibrate radially, the vibration connector 50 can also be provided to have a matched bending form, thereby ensuring accurate transmission of the vibration force as much as possible.

Figure 5:
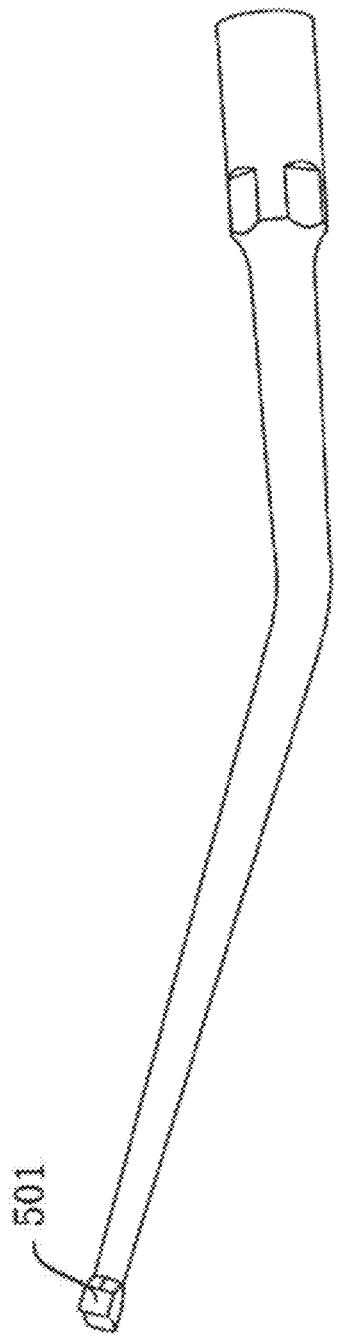
FIG. 5 is a first structural schematic view of the vibration connector in the root canal treatment device provided in some embodiments of the present disclosure.

FIG. 5 is a first structural schematic view of the vibration connector in the root canal treatment device provided in some embodiments of the present disclosure. As shown in FIG. 5, in an implementable mode of the embodiments of the present disclosure, a vibration head 501 is provided at one end of the vibration connector 50 connected to the root canal file 20, and the vibration head 501 is configured to have an end surface connected to the root canal file 20 to be a concave arc surface.

The root canal file 20 is usually in a cylindrical shape and has an operation end with a side surface being a rough surface facilitating grinding, and an end portion being in a needle tip structure, correspondingly, the vibration head 501 of the vibration connector 50 that needs to directly act on a side surface of the root canal file 20 to transmit the vibration has an end surface connected to the root canal file 20 being a concave arc surface, in this way, when transmitting vibration, a contact surface between the two is relatively matched, and a contact area is relatively large, preventing the transmitted vibration from acting on a very small area, thus reducing vibration strain of the root canal file 20, and improving the service life of the root canal file 20.

Specifically, a diameter of the arc surface of the vibration head 501 is greater than or equal to a diameter of the root canal file 20. In this way, when the vibration head 501 transmits a vibration force, the arc surface can wrap the root canal file 20 partially or in half, thereby more effectively and accurately transmitting the vibration force.

Figure 6:
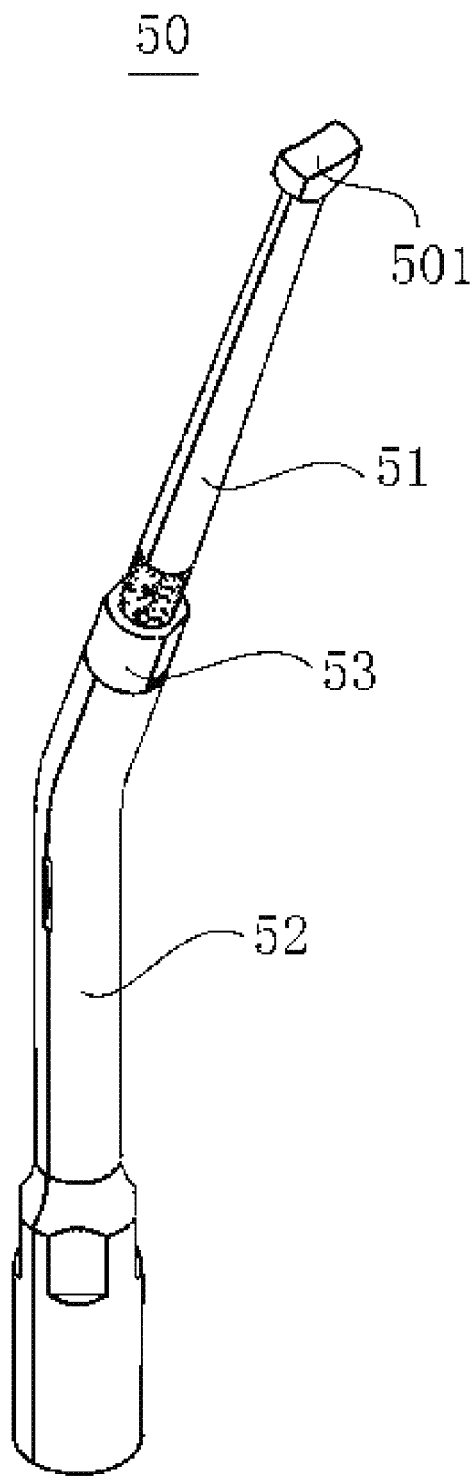
FIG. 6 is a second structural schematic view of the vibration connector in the root canal treatment device provided in some embodiments of the present disclosure.

FIG. 6 is a second structural schematic view of the vibration connector in the root canal treatment device provided in some embodiments of the present disclosure. In an implementable mode of the embodiments of the present disclosure, as shown in FIG. 6, the vibration connector 50 includes a first connecting rod 51 and a second connecting rod 52 whose end portions are sleeved with each other, a fastener 53 sleeved on a sleeve end of the first connecting rod 51, and the fastener 53 is configured to fix the sleeve end of the first connecting rod 51 and the second connecting rod 52.

In order to improve the practicability of the vibration connector 50 for root canal treatment devices of different models, and meet the requirement that the dimension may need to be adjusted when the root canal treatment device is used to perform a surgical operation, the vibration connector 50 may be configured in a two-section adjustable structure. The first connecting rod 51 and the second connecting rod 52 are sleeved with each other by end portions, and as shown in FIG. 6, the first connecting rod 51 and the second connecting rod 52 are sleeved by screw threads cooperating with each other, thus a telescopic length of the vibration connector 50 can be adjusted by changing a total length of the first connecting rod 51 and the second connecting rod 52. After the length is adjusted to an appropriate length, the fastener 53 is sleeved on sleeve end of the first connecting rod 51 and the second connecting rod 52 for fixation, which not only can adjust the length, but also can facilitate the fixation, wherein the vibration head 501 is provided at the end portion of the first connecting rod 51 of the vibration connector 50 close to the root canal file 20. For example, when the root canal treatment device of the embodiments of the present disclosure is used for other treatments, the vibration connector 50 may not need to be integrally disassembled, and it is only necessary to remove the first connecting rod 51 after the fastener 53 is loosened.

Figure 7:
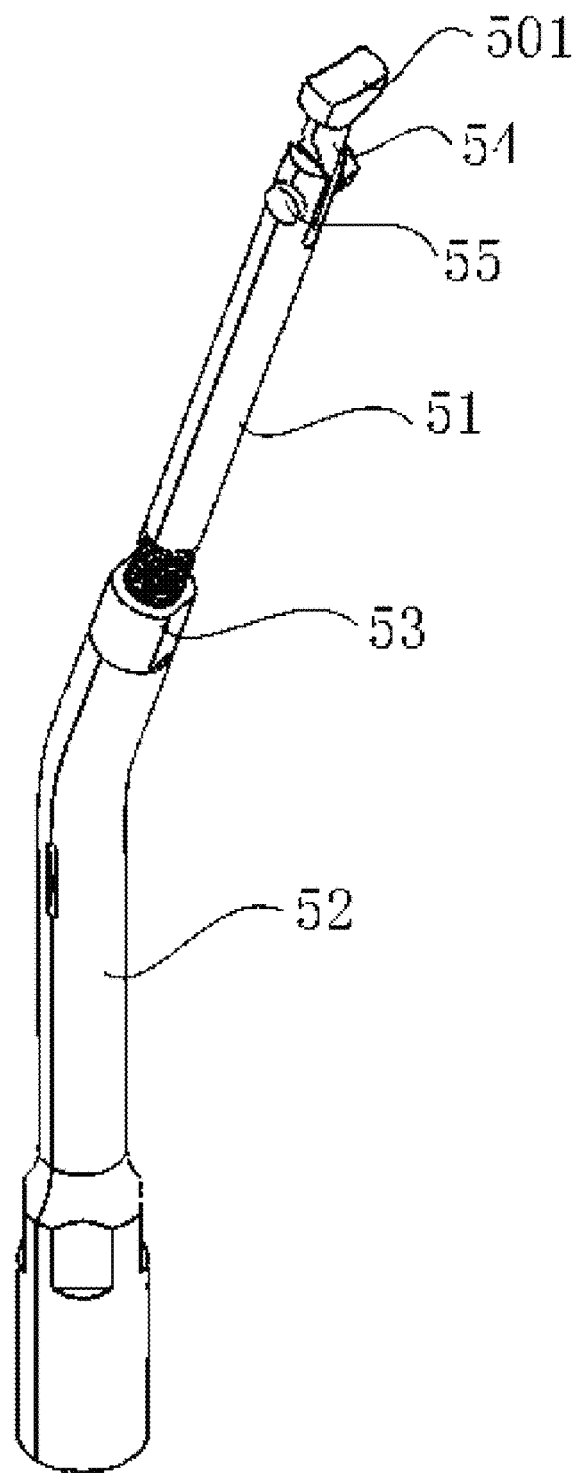
FIG. 7 is a third structural schematic view of the vibration connector in the root canal treatment device provided in some embodiments of the present disclosure.

FIG. 7 is a third structural schematic view of the vibration connector in the root canal treatment device provided in some embodiments of the present disclosure. In an implementable mode of the embodiments of the present disclosure, as shown in FIG. 7, the first connecting rod 51 is configured to be detachably connected to a connecting seat 54 at the other end connected to the root canal file 20, and a fixing member 55 is arranged to penetrate the connecting seat 54 and the first connecting rod 51.

The first connecting rod 51 is further detachably provided with the connecting seat 54, the first connecting rod 51 and the connecting seat 54 are fixed through the fixing member 55, and the first connecting rod 51 and the connecting seat 54 are also sleeved with each other and have an adjustable distance (length). As shown in FIG. 7, an end portion of the first connecting rod 51 can be configured in a through-groove structure, and correspondingly, the connecting seat 54 includes a portion extended into the through groove, and by adjusting the length of the portion of the connecting seat 54 extended into the through groove, the total length between the first connecting rod 51 and the connecting seat 54 can be adjusted, and then the total length of the vibration connector 50 can also be adjusted. As shown in FIG. 7, the vibration connector 50 is generally matched with a bending structure formed by the contra-angle hand-piece 10, therefore, two sides of the vibration connector 50 are each provided with a segmented structure capable of being adjusted in length. It is also possible to adjust the transmission direction of vibration to some extent while the total length of the vibration connector 50 can be adjusted, thereby providing a structure that is more adaptable to various clinical needs. Likewise, when the root canal treatment device of the present embodiment is used for performing other treatments, it may be not necessary to disassemble the whole vibration connector 50, and it only needs to remove the first connecting rod 51 after the fastener 53 is loosened.

In an implementable mode of the embodiments of the present disclosure, a nickel-titanium connecting rod is further provided between the ultrasonic transducer and the root canal file 20, and the ultrasonic transducer is connected to the root canal file 20 through the nickel-titanium connecting rod.

The nickel-titanium material has relatively soft texture and good flexibility. The nickel-titanium connecting rod prepared from the nickel-titanium material through a specific heat treatment process, having a certain degree of plastic deformation capacity, and provided between the ultrasonic transducer and the root canal file 20, can effectively transmit a vibration force provided by the ultrasonic transducer in a state abutting against the root canal file 20, and the angle and connection position of the nickel-titanium connecting rod and the tightness of the nickel-titanium connecting rod against the root canal file 20 can be manually bent and adjusted according to clinical requirements. In the embodiments of the present disclosure, the nickel-titanium connecting rod is not shown in the drawings, and for the shape and structure thereof, reference can be made to the vibration connector 50 integrally provided as shown in FIG. 4, but the foregoing nickel-titanium material is selected to realize the foregoing functions.

Figure 8:
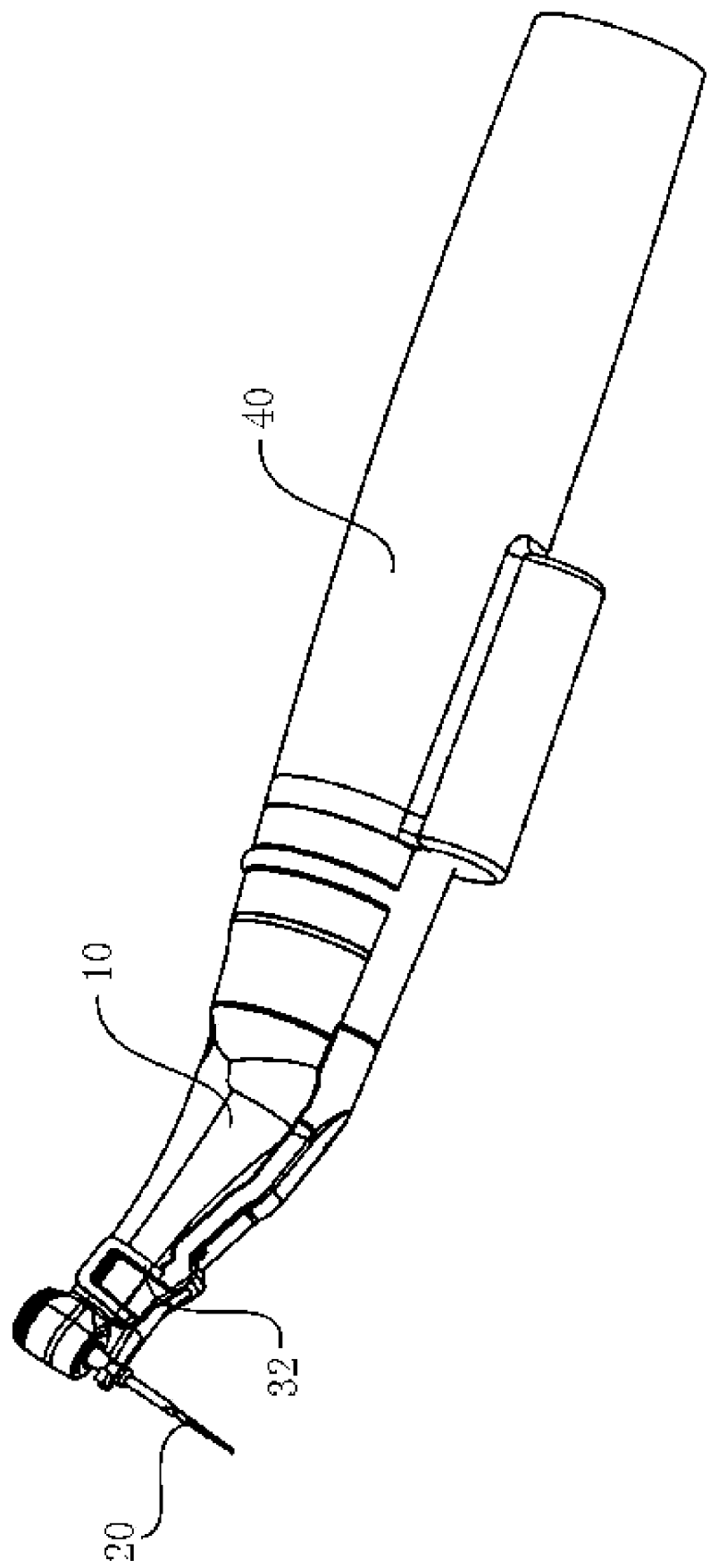
FIG. 8 is a structural schematic view of the vibration generator, being a vibrator, in the root canal treatment device provided in some embodiments of the present disclosure.
Figure 9:
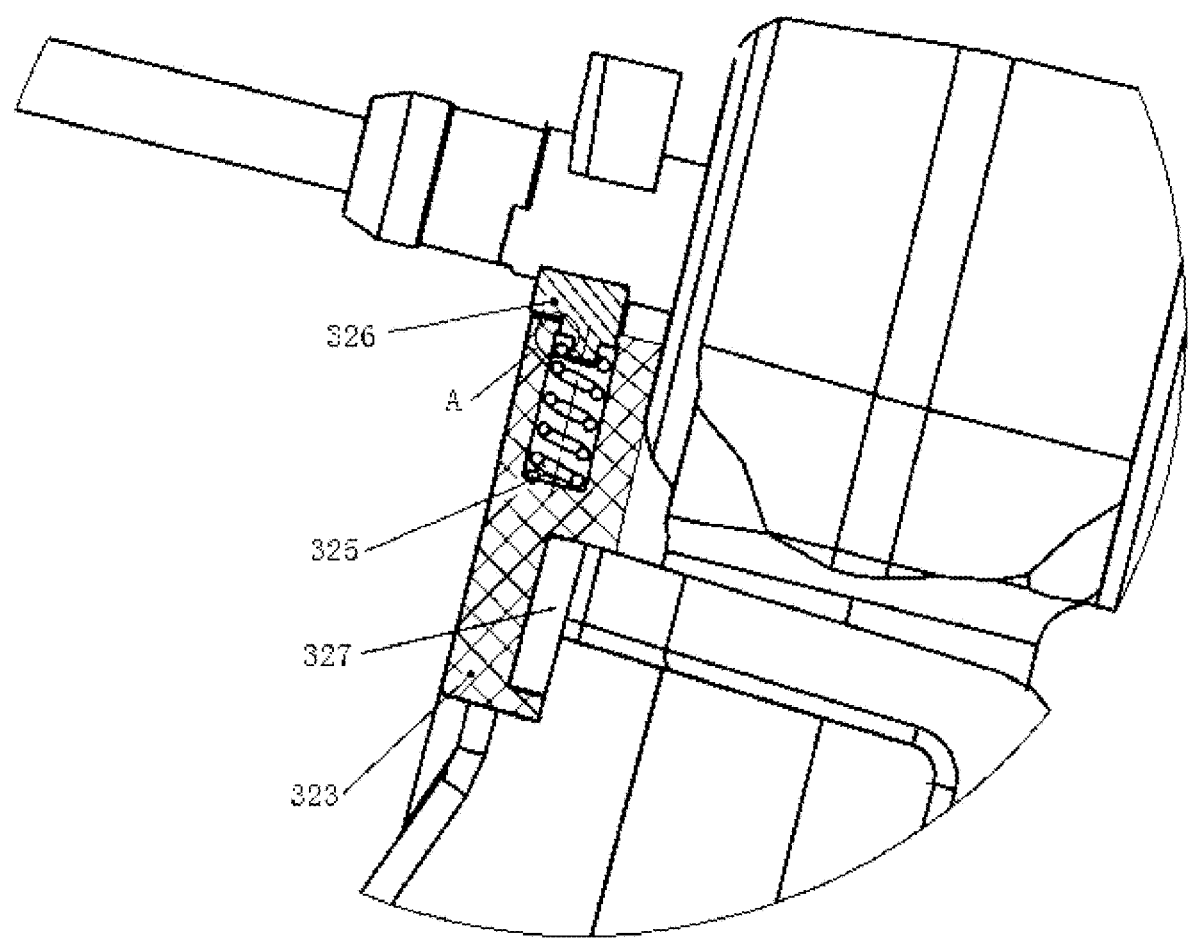
FIG. 9 is a partially enlarged view of FIG. 8.

FIG. 8 is a structural schematic view of the vibration generator, being a vibrator, in the root canal treatment device provided in some embodiments of the present disclosure. FIG. 9 is a partially enlarged view of FIG. 8. In an implementable mode of the embodiments of the present disclosure, as shown in FIG. 8 and FIG. 9, the vibration generator 32 is a vibrator, the vibrator includes a plastic housing 323 and a vibration motor 324 provided in the plastic housing 323, the vibrator is fixed on the contra-angle hand-piece 10 through the plastic housing 323; and a vibration output end of the vibration motor 324 is connected to a jacking block 326 through an elastic member 325, and the jacking block 326 is extended out of the plastic housing 323 through an opening provided on the plastic housing 323, and abuts against the root canal file 20 at a side wall of the root canal file 20.

As shown in FIG. 9, the vibration generator 32 is a vibrator, and power of vibration is provided by the vibration motor 324. The vibration motor 324 is provided in the plastic housing 323. The plastic housing 323 has a certain deformation capacity, and the plastic housing 323 is fixed on the contra-angle hand-piece 10. For example, the vibration motor 324 and the plastic housing 323 can be bonded with glue, or fixed in a snapping manner by interference fit, the vibration force transmitted by the vibration output end of the vibration motor 324 is transmitted to the jacking block 326 through the plastic housing 323, the jacking block 326 is extended out of the plastic housing 323 through an opening provided on the plastic housing 323, and abuts against the side wall of the root canal file 20. The elastic member 325 may be a spring as shown in FIG. 9, or other elastic connecting members. By providing the elastic member 325, the vibration force transmitted to the root canal file 20 can be buffered to a certain extent, and the root canal file 20 is effectively protected while transmitting the vibration force.

Figure 10:
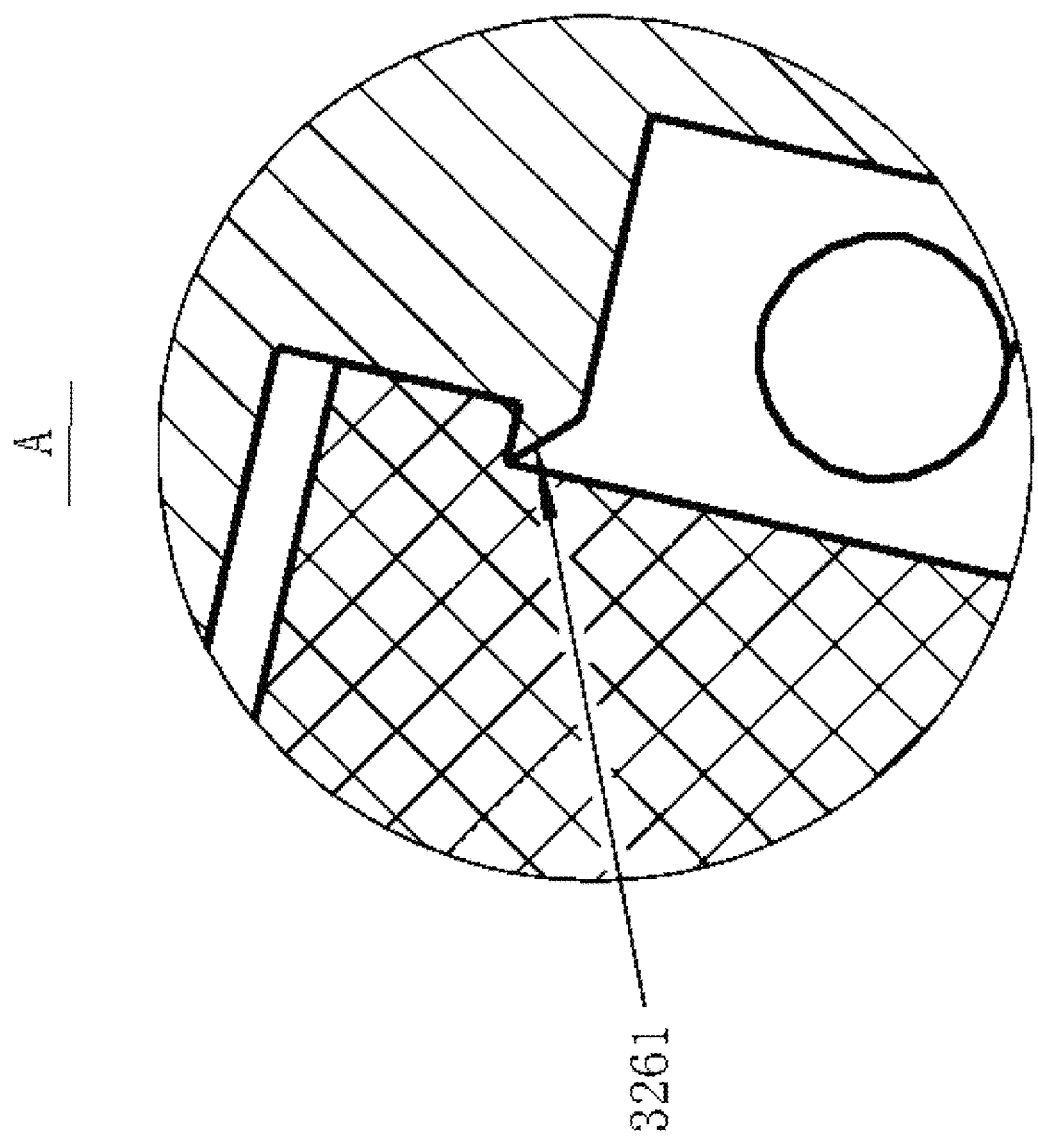
FIG. 10 is a partially enlarged view of region A in FIG. 9.

FIG. 10 is a partially enlarged view of region A in FIG. 9. As shown in FIG. 10, in order to avoid a risk that the jacking block 326 may be popped out of the plastic housing 323 when the vibration force of the vibration motor 324 is too large, a hook portion 3261 is formed on the jacking block 326, and the hook portion 3261 is configured to be snapped with an inner wall of the opening of the plastic housing 323, so as to limit the length of the jacking block 326 extended out of the opening. In this way, the jacking block 326 is snapped with the inner wall of the opening of the plastic housing 323 through the hook portion 3261 at a position of limit length extended out of the plastic housing 323 for position limiting, thus ensuring that the jacking block 326 will not come out from the plastic housing 323, and ensuring safety of operation.

As shown in FIG. 9, in an implementable mode of the embodiments of the present disclosure, a vibration-absorbing rubber pad 327 is provided on the plastic housing 323, and the plastic housing 323 and the contra-angle hand-piece 10 are snapped and fixed through the vibration-absorbing rubber pad 327.

As shown in FIG. 9, in order to avoid the vibration force of the vibration motor 324 from being directly transmitted to the contra-angle hand-piece 10 connected to the plastic housing 323, which, on one hand, leads to an ineffective loss of vibration force, and on the other hand, also makes the hand holding the root canal treatment device of the embodiments of the present disclosure bear unfavorable vibration feeling during operation, the plastic housing 323 is further provided with the vibration-absorbing rubber pad 327 for blocking the transmission of the vibration force on the plastic housing 323 to the contra-angle hand-piece 10. In the above, neither the set dimension of the vibration-absorbing rubber pad 327 on the plastic housing 323 nor the set thickness of the vibration-absorbing rubber pad 327 is specifically limited in the embodiments of the present disclosure, and a person skilled in the art could correspondingly configure them according to requirements.

In an implementable mode of the embodiments of the present disclosure, the vibrator further includes a power supply provided in the handle 40, and the power supply is electrically connected to the vibration motor 324 through a wire, and is configured to supply power to the vibration motor 324.

The power supply is provided in the handle 40, and the power supply supplies power to the vibration motor 324 via the wire, so that the root canal treatment device in the embodiments of the present disclosure can be taken and moved more conveniently when in use, wherein when the rotation driver 31 is a motor, the power supply can also supply power to the motor, thus avoiding the connection of a plurality of power supplies to cause the dimension of the root canal treatment device in the embodiments of the present disclosure to be large, redundancy of the arrangement of internal components, and incompactness of the structure.

It should be noted that, in the embodiments of the present disclosure, the form of the power supply is not specifically limited, either, for example, the power supply may be mains alternating current connected through an interface, a direct current, or an electricity storage and output component such as a storage battery.

Figure 11:
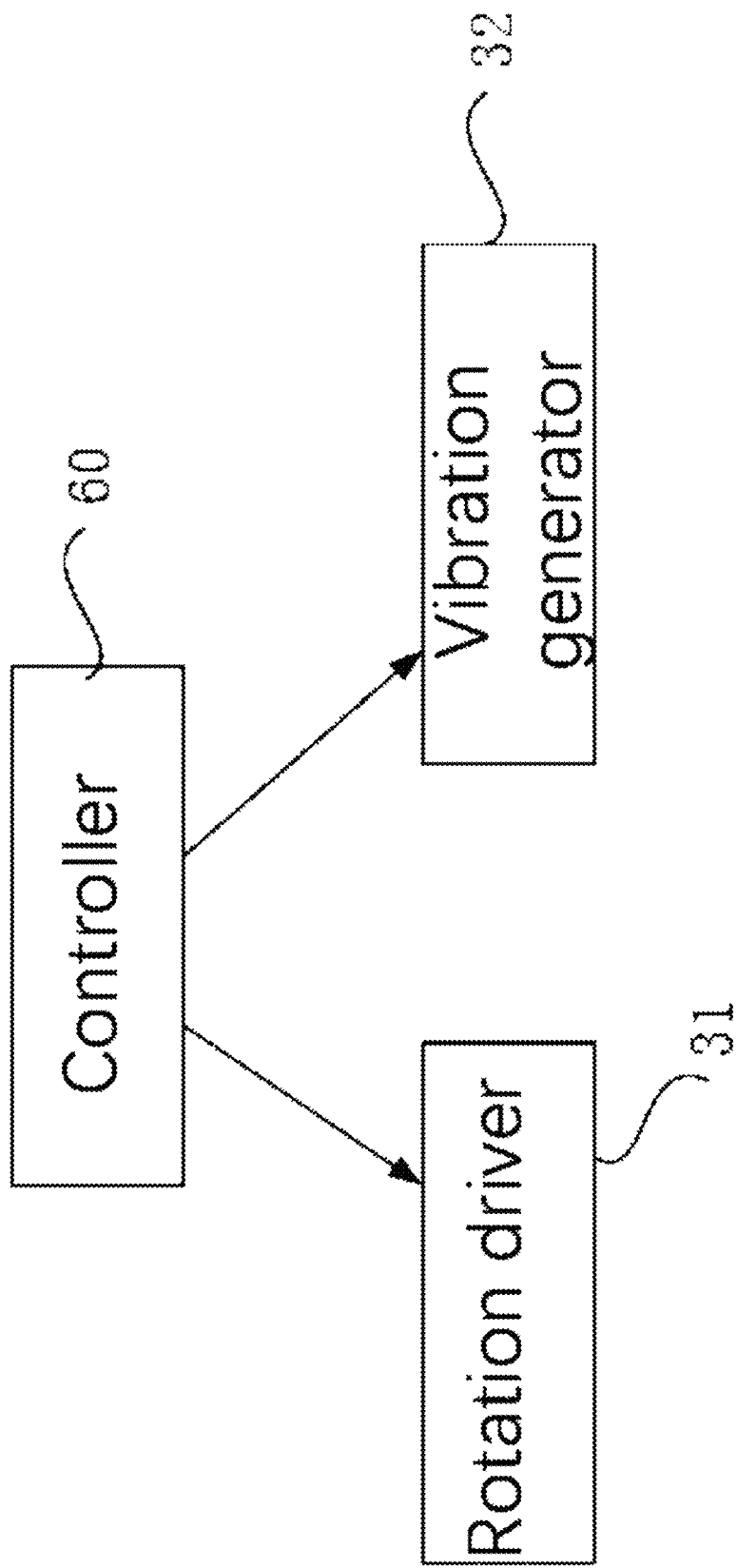
FIG. 11 is a schematic view of a control relation of the root canal treatment device provided in some embodiments of the present disclosure.

FIG. 11 is a schematic view of a control relation of the root canal treatment device provided in some embodiments of the present disclosure. In an implementable mode of the embodiments of the present disclosure, as shown in FIG. 11, the root canal treatment device of the embodiments of the present disclosure further includes a controller 60, wherein the controller 60 is electrically connected to the rotation driver 31 and the vibration generator 32, respectively, and is configured to control the operation of the rotation driver 31 and the vibration generator 32, respectively.

In this way, when the root canal treatment device of the embodiments of the present disclosure further includes a controller 60, and the controller 60 is electrically connected to the rotation driver 31 and the vibration generator 32, respectively, the controller 60 can control the operation of the rotation driver 31 and the vibration generator 32, respectively. Buttons corresponding to different control signals in the controller 60 may be provided on the handle 40, for example, a rotation start key, a vibration start key, and a rotation vibration key are separately provided on the handle 40. When the root canal treatment device of the embodiments of the present disclosure is used to perform the root canal treatment operation, the operator only needs to press the corresponding buttons on the handle 40 at different treatment stages, to only make the rotation driver 31 of the root canal treatment device start to operate, presenting an operation that that the root canal file 20 only rotates to perform the root canal cleaning and shaping, or to only make the vibration generator 32 of the root canal treatment device operate, presenting an operation that the root canal file 20 only vibrates to sufficiently activate the drug liquid filled in the root canal, or to make the rotation driver 31 and the vibration generator 32 in the root canal treatment device operate simultaneously, presenting a state that the root canal file 20 rotates and vibrates simultaneously, and sufficiently cleaning and discharging the air bubbles generated by the drug liquid filled in the root canal.

On this basis, it should be noted that the root canal treatment device of the embodiments of the present disclosure can further include a root canal length measurement sensor, configured to measure the length of the root canal currently being treated. When the root canal file 20 is rotated and moved to an apical stop, the root canal length measurement sensor senses a corresponding signal and transmits the signal to the controller 60, and the controller 60 sends a corresponding reverse, stop or deceleration signal to the rotation driver 31 according to a detection signal of the root canal length measurement sensor.

In addition, other structures that need to be implemented by the root canal treatment device in the prior art may also be integrated into the root canal treatment device of the embodiments of the present disclosure so as to realize corresponding functions.

The above-mentioned are merely embodiments of the present disclosure, and are not intended to limit the scope of protection of the present disclosure. For a person skilled in the art, the present disclosure may have various changes and variations. Any modifications, equivalent substitutions and/or improvements and the like made within the spirit and principle of the present disclosure should be included in the scope of protection of the present disclosure.

What is claimed is:

1. A root canal treatment device, comprising a contra-angle hand-piece and a root canal file detachably connected to the contra-angle hand-piece; and further comprising a drive module in transmission connection with the root canal file, wherein the drive module comprises a rotation driver and a vibration generator, the rotation driver is configured to drive the root canal file to rotate axially, and the vibration generator is configured to drive the root canal file to vibrate radially, wherein the root canal treatment device further comprises a handle connected to the contra-angle hand-piece, wherein the rotation driver is provided in the handle and the rotation driver drives the root canal file to rotate through the contra-angle hand-piece, the vibration generator is provided on the handle, and a vibration end of the vibration generator acts on the root canal file;

wherein the vibration generator is a vibrator, the vibrator comprises a plastic housing and a vibration motor provided in the plastic housing, and the vibrator is fixed on the contra-angle hand-piece through the plastic housing; and wherein a vibration output end of the vibration motor is connected to a jacking block through an elastic member, and the jacking block is extended out of the plastic housing through an opening provided on the plastic housing, and abuts against the root canal file at a side wall of the root canal file.

2. The root canal treatment device according to claim 1, wherein the vibration generator is an ultrasonic transducer.

3. The root canal treatment device according to claim 2, wherein the ultrasonic transducer comprises a shell and a transducer body provided inside the shell, and the shell is integrally molded with the handle, or the shell and the handle are detachably connected through a threaded fastener or a clamping member.

4. The root canal treatment device according to claim 2, wherein a vibration connector is further provided between the ultrasonic transducer and the root canal file, and the ultrasonic transducer is connected to the root canal file through the vibration connector.

5. The root canal treatment device according to claim 4, wherein a vibration head is provided at one end of the vibration connector connected to the root canal file, and the vibration head is configured to have an end surface connected to the root canal file to be a concave arc surface.

6. The root canal treatment device according to claim 5, wherein a diameter of the arc surface of the vibration head is greater than or equal to a diameter of the root canal file.

7. The root canal treatment device according to claim 6, wherein the vibration connector comprises a first connecting rod and a second connecting rod whose end portions are sleeved with each other, and a fastener sleeved on a sleeve end of the first connecting rod, wherein the fastener is configured to fix the sleeve end of the first connecting rod with the second connecting rod.

8. The root canal treatment device according to claim 5, wherein the vibration connector comprises a first connecting rod and a second connecting rod whose end portions are sleeved with each other, and a fastener sleeved on a sleeve end of the first connecting rod, wherein the fastener is configured to fix the sleeve end of the first connecting rod with the second connecting rod.

9. The root canal treatment device according to claim 4, wherein the vibration connector comprises a first connecting rod and a second connecting rod whose end portions are sleeved with each other, and a fastener sleeved on a sleeve end of the first connecting rod, wherein the fastener is configured to fix the sleeve end of the first connecting rod with the second connecting rod.

10. The root canal treatment device according to claim 9, wherein the first connecting rod is configured to be detachably connected to a connecting seat at the other end connected to the root canal file, and a fixing member is arranged to penetrate the connecting seat and the first connecting rod.

11. The root canal treatment device according to claim 2, wherein a nickel-titanium connecting rod is further provided between the ultrasonic transducer and the root canal file, and the ultrasonic transducer is connected to the root canal file through the nickel-titanium connecting rod.

12. The root canal treatment device according to claim 1, wherein a hook portion is formed on the jacking block, and the hook portion is configured to be snapped with an inner wall of the opening of the plastic housing, so as to limit a length of the jacking block extended out of the opening.

13. The root canal treatment device according to claim 1, wherein the vibrator further comprises a power supply provided in the handle, and the power supply is electrically connected to the vibration motor through a wire, and is configured to supply power to the vibration motor.

14. The root canal treatment device according to claim 1, wherein a vibration-absorbing rubber pad is provided on the plastic housing, and the plastic housing and the contra-angle hand-piece are fixedly snapped with each other through the vibration-absorbing rubber pad.

15. The root canal treatment device according to claim 1, further comprising a controller, wherein the controller is electrically connected to the rotation driver and the vibration generator, respectively, and is configured to control an operation of the rotation driver and the vibration generator, respectively.

\* \* \* \* \*